US009021520B2

(12) United States Patent
Gupta et al.

(10) Patent No.: US 9,021,520 B2
(45) Date of Patent: Apr. 28, 2015

(54) SYSTEMS AND METHODS FOR PROVIDING AND PROCESSING PRINT-AUGMENTED BROADCAST SIGNALS

(75) Inventors: Ajay Gupta, Bangalore (IN); Chandrasekar Venkatraman, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2989 days.

(21) Appl. No.: 10/954,816

(22) Filed: Sep. 29, 2004

(65) Prior Publication Data

US 2006/0075451 A1 Apr. 6, 2006

(51) Int. Cl.

| | |
|---|---|
| ***H04N 7/025*** | (2006.01) |
| ***H04N 7/10*** | (2006.01) |
| ***H04N 7/173*** | (2011.01) |
| ***H04H 20/86*** | (2008.01) |
| *H04H 20/28* | (2008.01) |
| *H04H 20/30* | (2008.01) |
| *H04H 60/27* | (2008.01) |
| *H04H 60/73* | (2008.01) |
| *H04H 60/74* | (2008.01) |

(52) U.S. Cl.

CPC ............... *H04H 20/86* (2013.01); *H04H 20/28* (2013.01); *H04H 20/30* (2013.01); *H04H 60/27* (2013.01); *H04H 60/73* (2013.01); *H04H 60/74* (2013.01)

(58) Field of Classification Search

None

See application file for complete search history.

(56) References Cited

U.S. PATENT DOCUMENTS

| | | | | |
|---|---|---|---|---|
| 4,025,851 | A | 5/1977 | Haselwood | |
| 4,694,490 | A | 9/1987 | Harvey | |
| 4,811,103 | A | 3/1989 | Casey | |
| 4,926,255 | A * | 5/1990 | Von Kohorn | 725/23 |
| 5,014,125 | A * | 5/1991 | Pocock et al. | 725/93 |
| 5,119,507 | A * | 6/1992 | Mankovitz | 455/154.1 |
| 5,343,239 | A | 8/1994 | Lappington | |
| 5,374,951 | A | 12/1994 | Welsh | |

(Continued)

FOREIGN PATENT DOCUMENTS

| | | | |
|---|---|---|---|
| EP | 0113436 | A2 | 12/1983 |
| FR | 2780228 | A1 | 6/1998 |

(Continued)

OTHER PUBLICATIONS

International Search Report and Written Opinion for PCT/IN2005/000325 dated Feb. 9, 2006, 10 pp.

(Continued)

*Primary Examiner* — Brian T Pendleton

*Assistant Examiner* — Dika C. Okeke

(74) *Attorney, Agent, or Firm* — Hewlett-Packard Patent Department

(57) ABSTRACT

A process for providing a print-augmented broadcast signal for transmission to one or more convention broadcast receiver includes receiving a broadcast signal comprising (i) standard content for a particular broadcast program and (ii) a non-content portion. Supplemental content which is associated with the standard content of the particular broadcast program is additionally received. Next, the supplemental content is combined onto the non-content portion of the broadcast signal to form a print-augmented broadcast signal, the print-augmented broadcast signal comprising the standard content, which can be rendered on a conventional broadcast receiver, and the supplemental content, which is printable on-demand at a destination conventional broadcast receiver substantially concurrently with the rendering of the standard content.

27 Claims, 8 Drawing Sheets

(56) References Cited

U.S. PATENT DOCUMENTS

| | | | | |
|---|---|---|---|---|
| 5,579,055 | A | 11/1996 | Hamilton | |
| 5,584,051 | A | 12/1996 | Goken | |
| 5,734,413 | A | 3/1998 | Lappington | |
| 5,737,595 | A * | 4/1998 | Cohen et al. | 348/E7.031 |
| 5,759,101 | A * | 6/1998 | Von Kohorn | 348/E7.024 |
| 5,903,262 | A | 5/1999 | Ichihashi | |
| 6,014,688 | A | 1/2000 | Venkatraman | |
| 6,055,023 | A | 4/2000 | Rumreich | |
| 6,097,441 | A | 8/2000 | Allport | |
| 6,263,507 | B1 | 7/2001 | Ahmad | |
| 6,415,438 | B1 | 7/2002 | Blackketter | |
| 6,530,082 | B1 | 3/2003 | Del Sesto | |
| 6,535,880 | B1 | 3/2003 | Musgrove | |
| 6,665,873 | B1 | 12/2003 | Van Gestel | |
| 6,768,722 | B1 | 7/2004 | Katseff | |
| RE38,600 | E * | 9/2004 | Mankovitz | 348/473 |
| 6,831,952 | B2 | 12/2004 | Symes | |
| 7,244,180 | B2 * | 7/2007 | McHugh | 725/24 |
| 7,296,282 | B1 | 11/2007 | Koplar | |
| 7,373,247 | B2 | 5/2008 | Park | |
| 7,409,700 | B1 * | 8/2008 | Watson | 725/51 |
| 7,966,634 | B2 * | 6/2011 | Hoppe et al. | 725/135 |
| 7,979,877 | B2 * | 7/2011 | Huber et al. | 725/36 |
| 2001/0055391 | A1 | 12/2001 | Jacobs | |
| 2002/0042920 | A1 | 4/2002 | Thomas | |
| 2002/0044763 | A1 | 4/2002 | Wehmeyer | |
| 2002/0078171 | A1 | 6/2002 | Schneider | |
| 2002/0083441 | A1 | 6/2002 | Flickinger | |
| 2002/0120925 | A1 | 8/2002 | Logan | |
| 2002/0152091 | A1 | 10/2002 | Nagaoka | |
| 2003/0046570 | A1 | 3/2003 | Ronkka | |
| 2003/0159153 | A1 | 8/2003 | Falvo | |
| 2004/0117857 | A1 | 6/2004 | Bisdikian | |
| 2005/0060337 | A1 | 3/2005 | Chou | |
| 2005/0100113 | A1 | 5/2005 | Corts | |
| 2005/0130585 | A1 | 6/2005 | Gnuschke | |
| 2005/0155062 | A1 | 7/2005 | Hiltunen | |
| 2005/0278747 | A1 | 12/2005 | Barton | |
| 2006/0028689 | A1 | 2/2006 | Perry | |
| 2006/0123449 | A1 | 6/2006 | Ma | |
| 2006/0184994 | A1 | 8/2006 | Eyer | |

FOREIGN PATENT DOCUMENTS

| | | | |
|---|---|---|---|
| GB | 2346472 | | 8/2000 |
| WO | WO 99/35771 | | 7/1999 |
| WO | 99/67904 | | 12/1999 |
| WO | 02/102079 | A1 | 12/2002 |
| WO | 03/034735 | A1 | 4/2003 |
| WO | 03/095945 | A2 | 11/2003 |

OTHER PUBLICATIONS

International Preliminary Report on Patentability for PCT/IN2005/000325 dated Nov. 8, 2007, 7 pp.

International Search Report and Written Opinion for PCT/IN2005/000313 dated Feb. 9, 2006, 12 pp.

International Preliminary Report on Patentability for PCT/IN2005/000313 dated Apr. 12, 2007, 8 pp.

International Search Report and Written Opinion for PCT/IN2005/000269 dated Oct. 28, 2005, 11 pp.

International Preliminary Report on Patentability for PCT/IN2005/000269 dated Apr. 12, 2007, 2 pp.

International Search Report and Written Opinion for PCT/IN2005/000124 dated Aug. 4, 2005, 15 pp.

International Preliminary Report on Patentability for PCT/IN2005/000124 dated Apr. 12, 2007, 8 pp.

International Search Report and Written Opinion for PCT/IN2005/000351 dated Mar. 1, 2006, 10 pp.

International Preliminary Report on Patentability for PCT/IN2005/000351 dated Nov. 8, 2007, 6 pp.

International Search Report and Written Opinion for PCT/IN2005/000344 dated Jun. 2, 2006, 12 pp.

International Preliminary Report on Patentability for PCT/IN2005/000344 dated Feb. 21, 2008, 8 pp.

International Search Report and Written Opinion for PCT/IN2005/000350 dated Mar. 16, 2006, 10 pp.

AGB Italia, "The System>Data transmission" webpage, 2003.

AGB Italia, "The System>The Peoplemeter" webpage, 2003.

* cited by examiner

SYSTEMS AND METHODS FOR PROVIDING AND PROCESSING PRINT-AUGMENTED BROADCAST SIGNALS

CROSS-REFERENCE TO RELATED APPLICATIONS

This patent application is related to the commonly-owned, concurrently filed patent application entitled: "Systems and Methods for Subsidizing the Printing Costs of Advertiser-Sponsored Documents," the contents of which are herein incorporated by reference in its entirety for all purposes.

BACKGROUND

The present invention relates to systems and methods for providing and processing broadcast information, and more particularly to systems and methods for providing and processing print-augmented broadcasting.

Television and radio broadcasting technologies are very well suited for providing content to listeners and viewers on a mass scale. Especially in developing countries where opportunities for entertainment are limited, television and radio provides the largest audience for the entertainment media. Businesses also heavily rely upon radio and television broadcasting to advertise their products in the most cost effective way. Government entities also use radio and television broadcasts to reach as many people as possible in conveying information or warning of an impending dangerous condition.

While broadcasting is very effective in disseminating program content, it is less effective in maintaining contact with the viewer or listener when that person becomes interested in obtaining additional information about the program. For example, a viewer of a television program about home remodeling may want to obtain the specific building plans for a project built during the program. The program producers anticipate this, and usually invite the viewer to telephone a call center, visit their website, or mail a request for further information. If the contact instructions come during the program, the viewer is distracted to either collect a pencil and paper to take down a telephone number or mailing address, or log on to a website to find the supplemental information they are seeking. If the contact instructions are made available at the end of the program, the viewer may have lost some interest in the program, and according may be less inclined to use the contact information. Thus, a potential opportunity to continue contact with the viewer is lost.

Similarly, radio broadcasts (AM, FM, digital broadcasts) are another primary means of information delivery and entertainment in large rural communities, and in specific urban situations which require eyes free and hands free information delivery (e.g. while driving or engaged in another activity). If the user wishes to "take away" some of the information that is being shared through the radio program, it will require the consumer to take their attention away from what they are doing which is usually not feasible.

What is needed is a process for providing printable supplemental program content to a viewer or listener substantially concurrently with the program content in a manner which will not distract the party from the broadcast program. By providing the supplemental content in print form concurrently with the viewing or listening experience, the program provider will increase their opportunity for continued viewer or listener contact as well.

SUMMARY

An embodiment of the present invention includes first receiving a print-augmented broadcast signal within a conventional broadcast receiver, the print-augmented broadcast signal including standard content for a particular broadcast program, and printable supplemental content which is associated with the standard content of the particular broadcast program and which is combined onto a non-content portion of the print-augmented broadcast signal. Next, the supplemental content is extracted from the non-content portion of the print-augmented broadcast signal, and the standard content is rendered. The supplemental content is output from the conventional broadcast receiver and can be printed on-demand substantially concurrently with the rendering of the program's standard content.

These and other features of the invention will be better understood in light of the following drawings and detailed description.

DETAILED DESCRIPTION

Figure 1A:
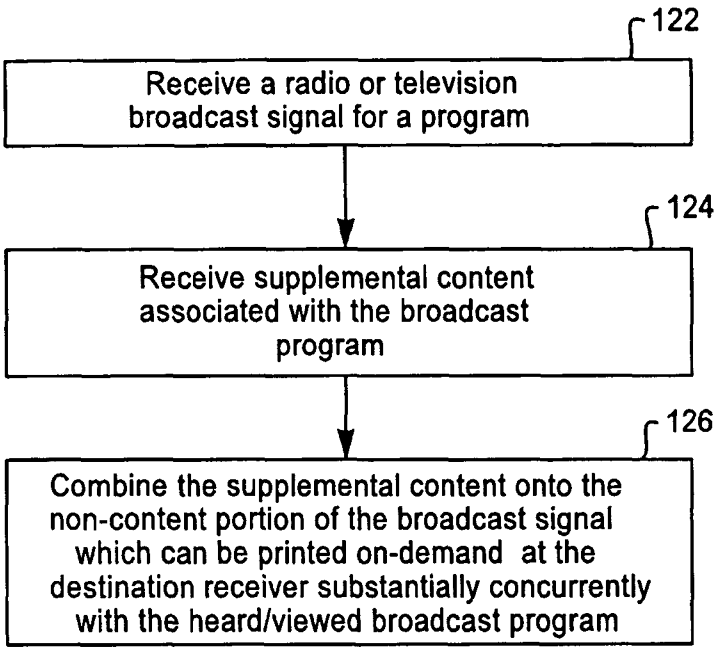
FIG. 1A illustrates an embodiment for providing a print-augmented broadcast signal for transmission to one or more conventional broadcast receivers in accordance with one embodiment of the present invention.

For clarity and convenience, the following definitions are used herein:

The term "print-augmented broadcast signal" refers to a broadcast signal that has printable "supplemental content" added to the broadcast signal.

"Supplemental content" defines information and data which are complementary and specific to the standard program content communicated by the broadcast signal, and, further particularly, is specific to the standard content conveyed by the particular segment of the broadcast signal. The supplemental content is able to be printed or stored at the receiving end, in a specific embodiment, substantially concurrently with the rendering of the standard content to which the supplemental content is associated.

Also as used herein, the description "non-content portion of the broadcast signal" refers to that portion of the broadcast signal (radio or television, analog or digital) which does not include standard program content. The non-content portion of the broadcast signal is the vehicle by which the supplemental content is conveyed to the receiver. Exemplary embodiments include the vertical blanking interval (VBI) of an analog television signal or an equivalent signal portion of digital television broadcast signal, as well as equivalents in the radio broadcasting field, e.g., the programming associated data channel in a digital audio broadcast signal.

The term "conventional broadcast receiver" refers to radio and/or television receiver sets which are primarily dedicated to the function of receiving radio and/or television broadcasts, respectively, and which having demodulation circuitry operable to extract standard program content and the above-defined non-content portion from print-augmented broadcast signal. "Conventional radio receivers/sets" within this definition include digital audio radios as described below, although other digital and/or analog receivers operable to separate standard programming and non-programming content from a radio broadcast signal may be employed in alternative embodiments. "Conventional television receivers/sets" within this definition include analog television sets, such as those configured to process broadcast signals transmitted in NTSC, PAL and SECAM broadcast formats, digital televisions receivers, such those operable to process HDTV broadcasts and the like. Specifically excluded from "conventional broadcast receivers" are systems, such as computers, which can be programmed or otherwise modified to emulate the functionality of a commonly known television or radio receiver. Such systems do not have as a primarily function, and are not specifically dedicated to operate as broadcast receivers, and according are not within the scope of the present disclosure. The term "conventional" as used with regard to broadcast, radio, or television receivers/sets refers to the primary functionality of the broadcast receiving system as described, and does not refer to the timing of when such a broadcast system was developed or deployed, which may be at any time during the past, present or future.

Varying embodiments of the present invention provide systems and methods for conveying printable supplemental content by means of print-augment broadcast signal, which has the format of a television or radio signal. The print-augmented signal, in addition to the program content, includes supplemental content which is combined onto a non-content portion of the television or radio signal. The supplemental content can be recovered by a conventional radio or television receiver, the supplemental content being output to a content processor. The content processor is operable to assemble and provide supplemental documents containing the available supplemental content, for example in printed or stored electronic form. In a specific embodiment, the content processor provides access to the supplemental content substantially concurrently with the viewing or listening of the program portion to which the supplemental content relates. Further specifically, the process of instructing the content processor to print the supplement content is done by remote control or other manner which provides little if any distraction from the present viewing or listening experience.

FIG. 1A illustrates an embodiment for providing a print-augmented broadcast signal for transmission to one or more conventional broadcast receivers. The method may be performed at a broadcast station or other entity which produces the broadcast program. Initially at 122, a conventional broadcast signal is received, the broadcast signal including standard content for a particular radio or television broadcast program. The broadcast signal includes, in addition to the standard content, a non-content portion onto which supplemental content can be combined (e.g., by modulating the signal representation of the supplement content onto the non-content signal portion). Also received is supplemental content which is associated with the particular broadcast program (124). At 126, supplemental content is combined onto the non-content portion of the broadcast signal to form a print-augmented broadcast signal, the print-augmented broadcast signal including the standard content, which can be rendered on a conventional broadcast receiver, and the supplemental content, which can be printed on-demand at a destination receiver.

Figure 1B:
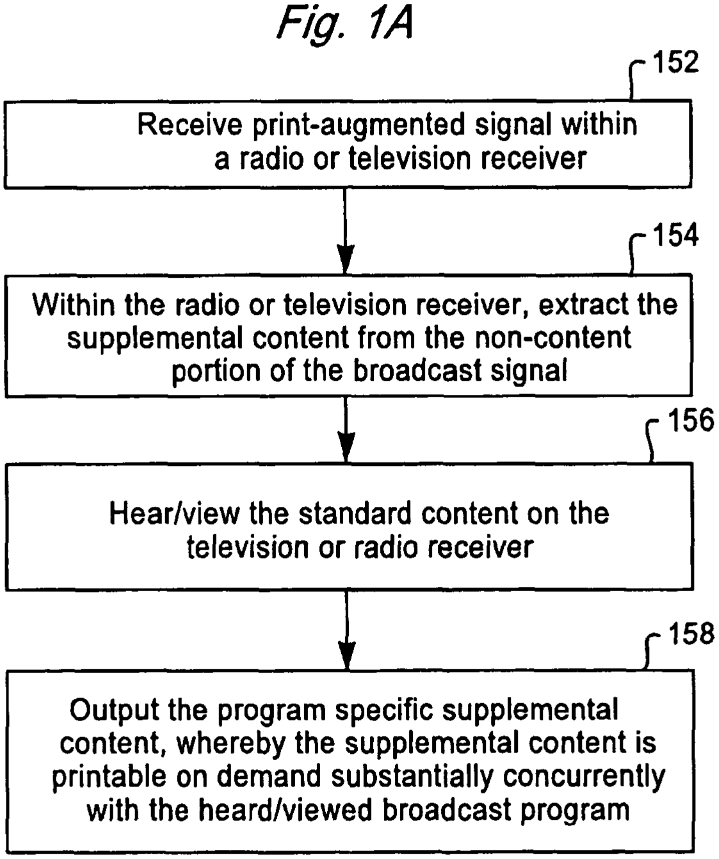
FIG. 1B illustrates a method for processing a received print-augmented broadcast signal in accordance with one embodiment of the present invention.

FIG. 1B illustrates a method for processing a received print-augmented broadcast signal. The method may be employed in a television or radio receiver which receives the print-augmented broadcast signal. Initially at 152, a print-augmented broadcast signal is received within a conventional broadcast receiver, the print-augmented broadcast signal including (i) standard content for a particular broadcast program, and (ii) supplemental content which is associated with the standard content of the particular broadcast program, wherein the supplemental content is combined onto a non-content portion of the print-augmented broadcast signal. Subsequently at 154, the supplemental content is extracted from the non-content portion of the print-augmented broadcast signal within the receiver (e.g., by demodulating the signal representation of the supplement content from the non-content signal portion). At 156, the standard content is rendered on the conventional broadcast receiver, and at 158, the supplemental content is output from the conventional broadcast receiver, whereby the output supplemental content is printable on-demand substantially concurrently with the broadcast program's rendering.

Several exemplary embodiments of the invention are now set forth below, with features particular to the specific embodiment shown. Those skilled in the art will appreciate that the described embodiments are only representative, and variations, modifications and/or additions to the features shown may be used under alternative embodiments of the present invention.

Print-Augmented Television Broadcasts

As known in the art of analog television broadcasting, the vertical blanking interval is a non-content portion of the television broadcast signal which can be used to carry other information and data. Presently, teletext information, perhaps most used widely in Europe, is conveyed by modulating the information onto the portion of the signal. In this manner the vertical blanking index, creates another "channel" by which the content of another program can be conveyed.

More recently, a variety of digital video broadcast (DVB) standards are also being used to broadcast programming via satellite (DVB-S), cable (DVB-C), terrestrial (DVB-T), or via handheld and mobile terminals (DVB-H). Similar to the VBI standards of analog TV broadcast signals, DVB broadcast signals also allow the simulcasting of supplemental content data through DVB-TXT or DVB-VBI. When a digital broadcasting system is employed, the DVB-TXT/VBI standard is used to deliver the supplemental content as earlier described. For convenience, the description "vertical blanking interval" shall refer to the vertical blanking interval of the analog broadcast television signal, as well as the equivalent portion of the digital broadcast television signal.

Figure 2A:
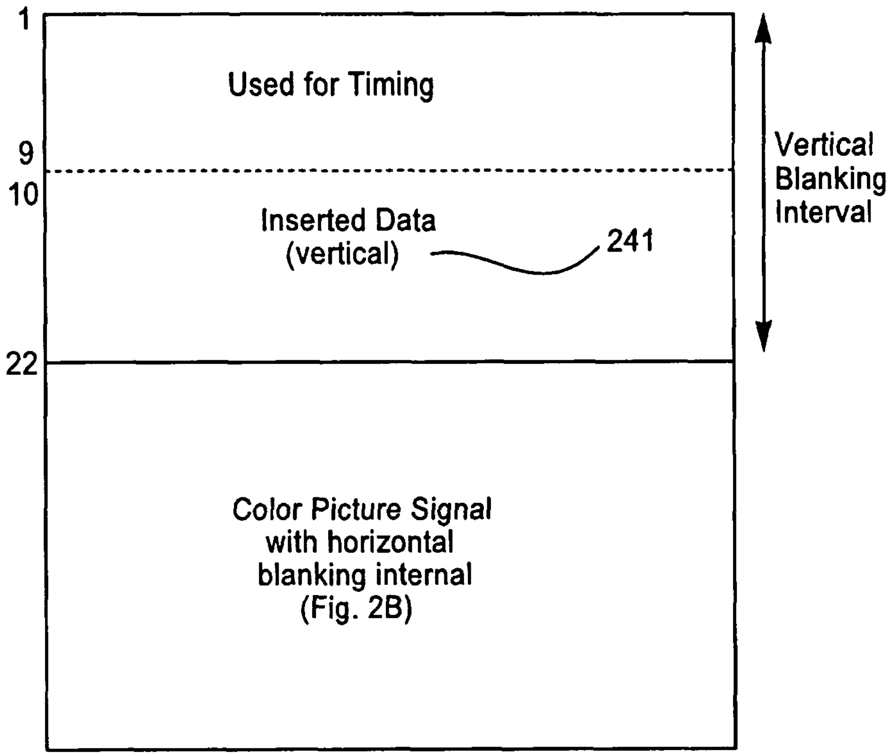
FIG. 2A illustrates location of vertical blanking interval of a conventional broadcast television signal known used in the present invention.

FIG. 2A illustrates location of vertical blanking interval of a conventional broadcast television signal known used in the present invention. Data 241 can be inserted in the vertical blanking interval lines. In the case of NTSC they are lines 10 to 22. Typically teletext and closed-caption information are carried in these lines.

Figure 2B:
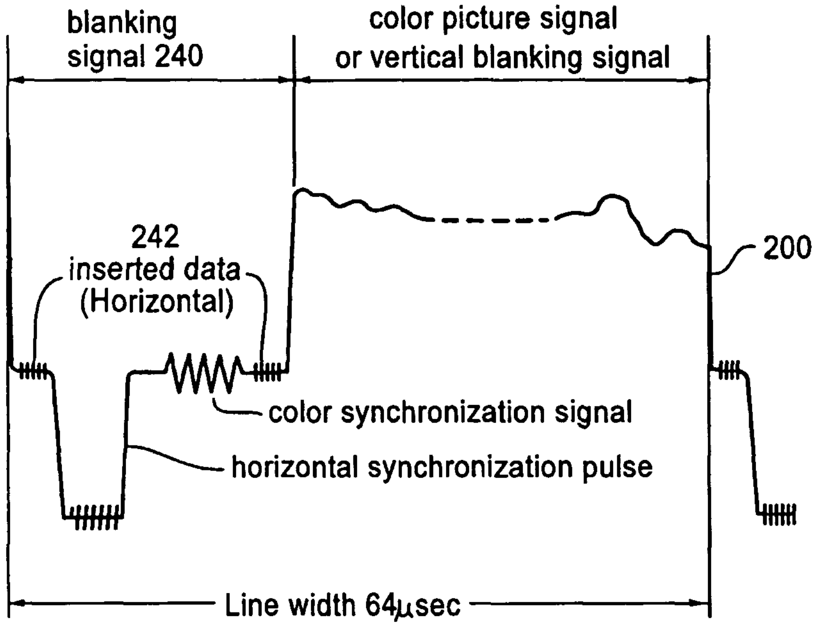
FIG. 2B illustrates horizontal blanking interval of a conventional broadcast television signal known used in the present invention.

FIG. 2B illustrates the horizontal blanking interval of an analog television signal which may be used in the present invention. Data 242 which is combined onto the horizontal blanking portion 240 is not displayed on the television screen with the standard program content, as the television tuner is operable to process only the standard program content embedded in the other parts of the television broadcast signal 200.

In a teletext system, a separate channel of information is formed by modulating various types of information (news, sports, advertisements, etc.), onto the vertical blanking intervals of television signals, that information having little, if any, correlation to the particular content of the broadcast signal 200. In an embodiment, the vertical blanking interval is utilized to transport supplemental content specific to the content of the particular broadcast signal 200. In a further embodiment, the content modulated onto a particular vertical blanking interval represents supplemental content to that standard program content embedded in adjacent signal portions, such that each program segment may have different supplemental content associated with the program segment that can be accessed.

Figure 3A:
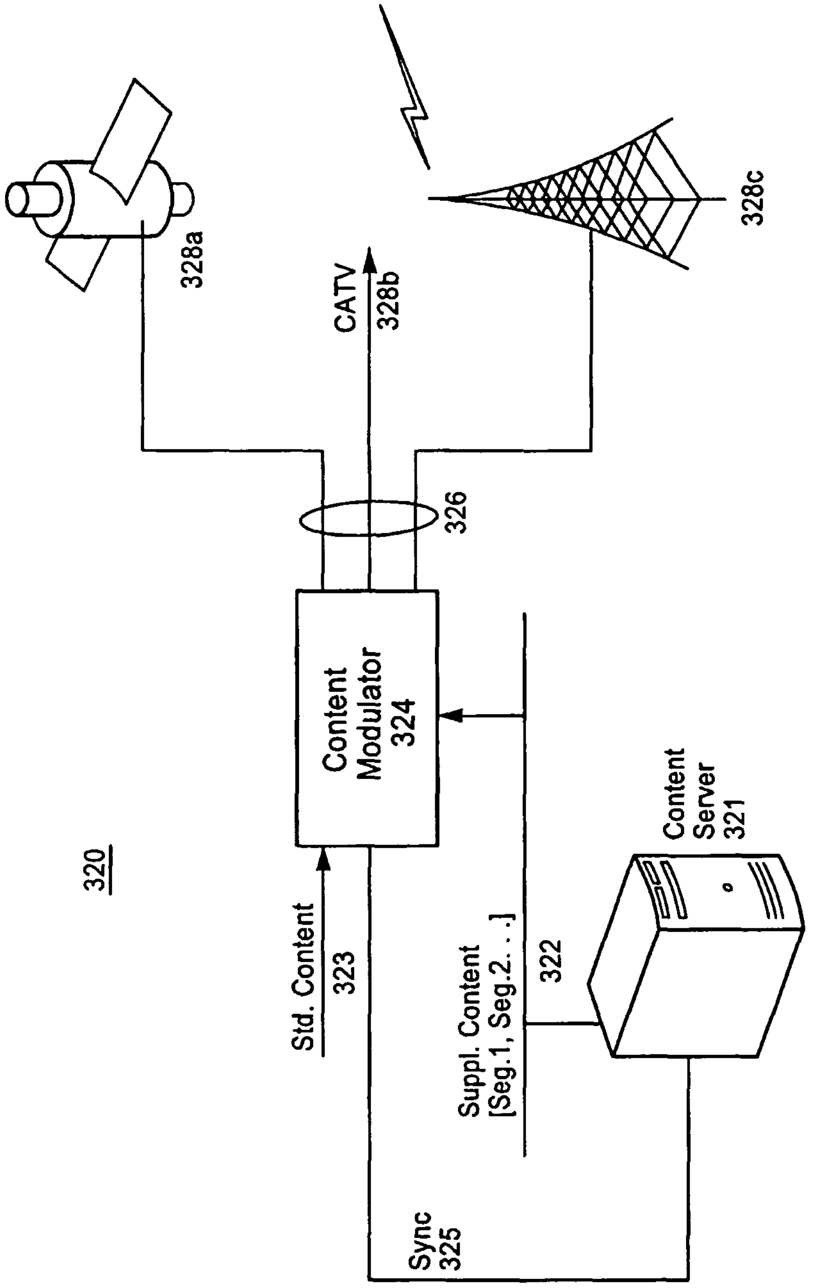
FIG. 3A illustrates a system for providing a print-augmented broadcast signal in accordance with one embodiment of the present invention.
Figure 3B:
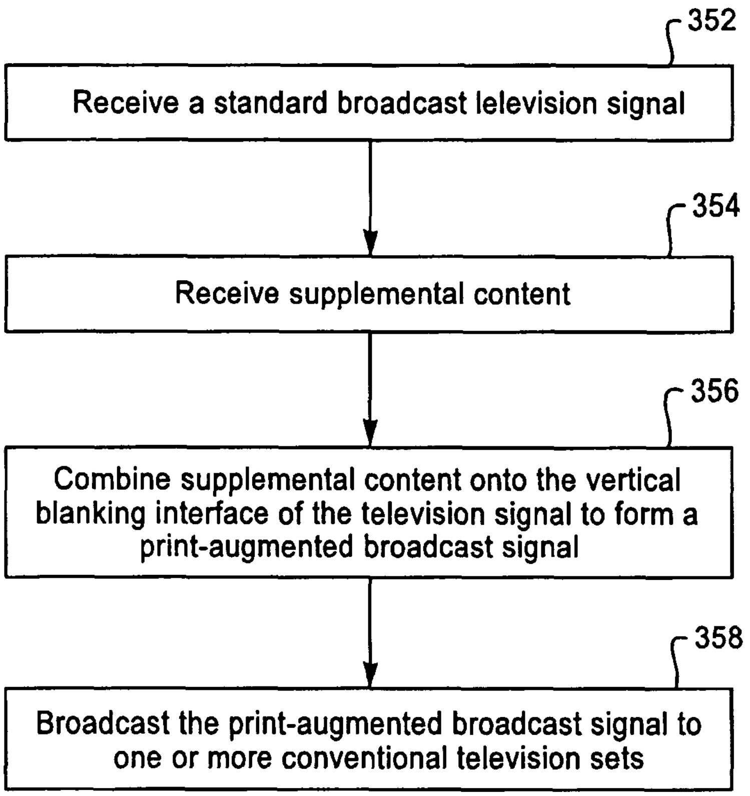
FIG. 3B illustrates a method for providing a print-augmented broadcast signal in accordance with one embodiment of the present invention.

FIGS. 3A and 3B illustrate an embodiment of a system and corresponding method for providing a print-augmented broadcast signal. Referring first to the system 320 illustrated in FIG. 3A, the system includes a content server 321, a content modulator 324 and a broadcast means 328, which may include a satellite transmitter 328*a*, a cable television transmitter 328*b*, or a transmitting tower 328*c*. These transmitting systems are only exemplary, and other transmitter embodiments will be apparent to those skilled in the art.

The content server 321 is operable to provide supplement content 322 which is associated solely with a particular broadcast program. Supplemental content 322 may include further information concerning the particular program's standard content 323, such as additional facts, figures or other data, contact information such as a telephone number, physical or email addresses, or similar information which is specific to the standard content of the particular broadcast program. Further, identifying information may be included such as the version number, size, copyright/digital-right status, author and language of the supplemental content file. Additionally, program-specific advertiser/sponsor information may be included in the supplemental content 322, for example, a list of manufacturers who provides the cooking equipment shown in the program. In another embodiment, the supplemental content 322 includes interactive information, i.e., information which is designed to create an interactive session with the receiving viewer. Such information may include viewer queries which poses questions as to the content of the particular broadcast program, and which invites a response thereto. A particular embodiment of this type of process is further described below. Those skilled in the art will appreciate that other types of supplemental content may be included as well; the only requirement being that information not related to the standard content of the particular broadcast program is excluded from the supplemental content 322.

The supplemental content 322 may be parsed into two or more segments, each segment corresponding to different segments of the standard program content. For example, a cooking program may describe the processes of preparing several different dishes. Supplemental content 322 may accordingly include different content segments which includes details as to the recipe, recommended cooking times, etc. as to each of the different dishes. The content segments are accordingly sequenced so that the supplemental content they contain is synchronized with the standard program content 323 received by the content modulator 321. This process may be facilitated by the use of a synchronization signal 325 communicated between the content server 321 and the content modulator 324.

In a specific embodiment, the supplement content 322 is organized into a structured file or document, such as an extensible markup language (xml) document. As such, the supplement content 322 includes meta-data which is tagged using known and/or broadcast industry adopted tags and fields. For example, identification of a sponsor/advertiser associated with one or more of the content segments may be identified using the meta-data tag "Sponsor ID". Other meta data tags corresponding to additional information may also be used. For example, meta data tag "Lang ID" may be used to identify the content language, "Date ID" to identify the composition date of the content, "DRM ID" to identify digital rights management information, "Exp ID" to identify an expiration date associated with the content, and "Enc ID" to identify encryption information applied to the content. These represent only a small sample of the possible meta data tags and type of information which can be conveyed, and others may be used alternatively or in addition in other embodiments.

Furthermore, the structure document is linked (i.e., associated) with the particular broadcast program, either as one complete document which contains one or more content segments, or alternatively as a document for only a single content segment. In the latter case, two or more such documents are used to compose the entire stream of supplement content 322, each document being linked to a corresponding standard content portion. The supplemental content, in this exemplary embodiment, will include both content and identifying information (e.g., "Sponsor ID") in xml meta-data.

Referring to FIG. 3B in which the corresponding process of providing the print-augmented broadcast signal is described, initially at 352, the content modulator 324 receives a television signal that carries the standard content 323 of the broadcast program. In one embodiment, the standard content 323 will typically include the previously produced audio/video portions of the program, content identifying information, sponsor/advertiser information, or other program related content. In other embodiments, however, such as televised sports programs, the standard content 323 is produced in real-time. In these embodiments, corresponding supplemental content 321 (for example, the batting average of a currently displayed baseball player at-bat which may be prepared beforehand), is supplied to the content modulator 321 synchronously with the live program data.

Next at 354, the content modulator receives the supplemental content 322, and subsequently at 356, modulates the supplement content 322 onto the vertical blanking interval of the broadcast signal carrying the standard content 323 to form a print-augmented broadcast signal 326. Other processes may be used to complement the modulation processes. For example, a forward error correcting algorithm may be applied to the supplemental content to improve transmission reliability. Of course, other coding algorithms may be used in alternative embodiments.

The modulation process, in a specific embodiment, is synchronized such that segments of the supplemental content 321 are modulated onto those vertical blanking intervals occurring on the broadcast signal portion which carries corresponding standard content. The print-augmented broadcast signal 326 retains the signal waveform of a television signal, and can therefore be processed by a conventional television set.

The signal 326 is subsequently provided to the desired transmitting apparatus (e.g., a satellite transmitter 328*a*, cable television transmitter 328*b*, or television broadcast tower 328*c*) for broadcast to a multitude of conventional television sets. As used herein, the term "conventional television set" refers to conventional analog television sets, such as those configured to process broadcast signals transmitted in NTSC format, using e.g., North American Basic Teletext Standard (NABTS), PAL and SECAM broadcast formats, using e.g., the European Broadcast Union (EBU) Teletext Standards. In a further embodiment, the term "conventional television set" includes digital televisions receivers, such those operable to process HDTV broadcasts using e.g., the Vertical Ancillary Data Standard (VANC), and the like. In its broadest embodiment as defined above, the term "conventional television set" extends to television sets primarily operable to receive broadcast standards, regardless of when developed, which employ a non-content portion of the broadcast signal on which the supplemental content can be modulated.

Figure 4A:
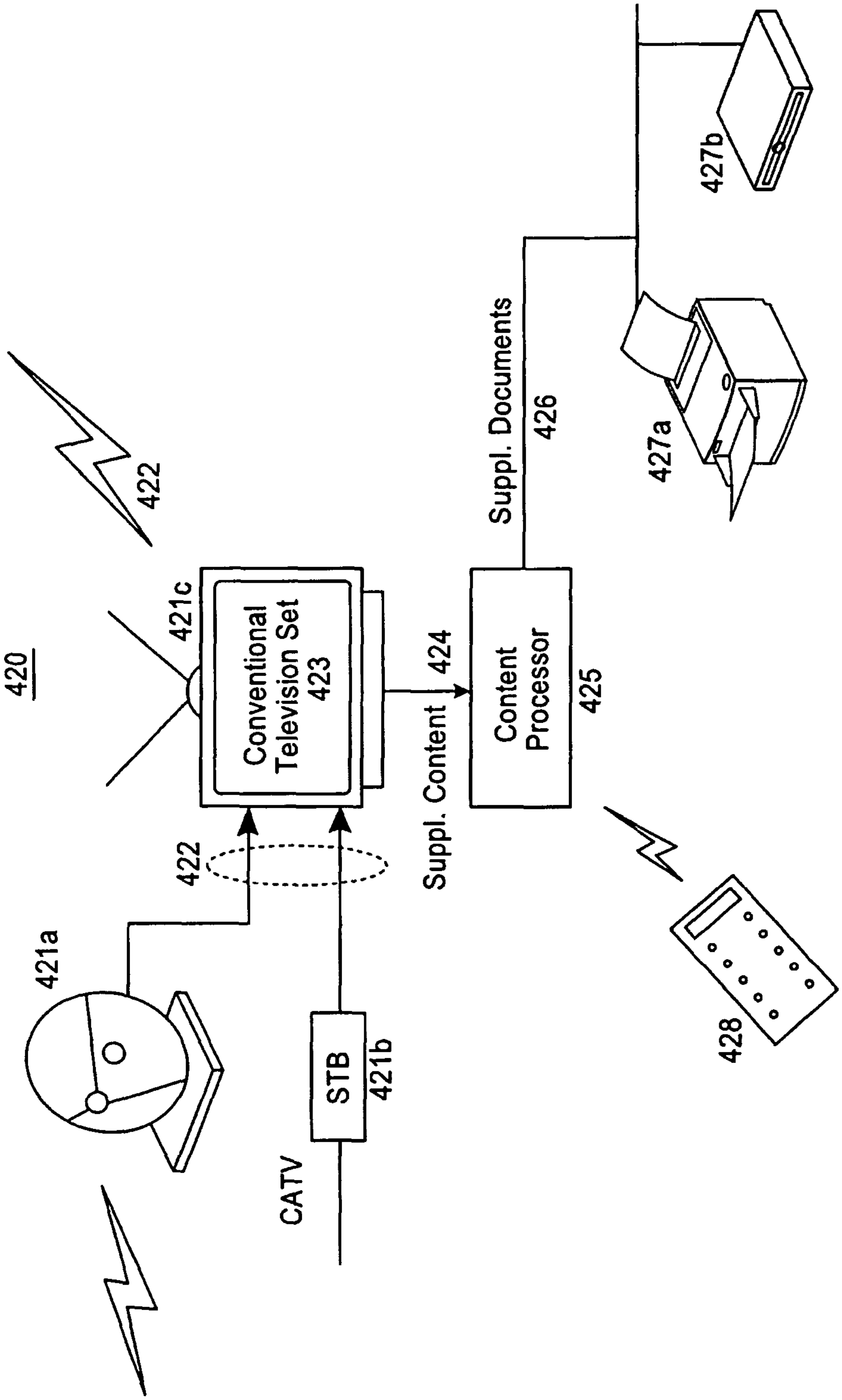
FIG. 4A illustrates a system for processing a received print-augmented broadcast signal in accordance with one embodiment of the present invention.
Figure 4B:
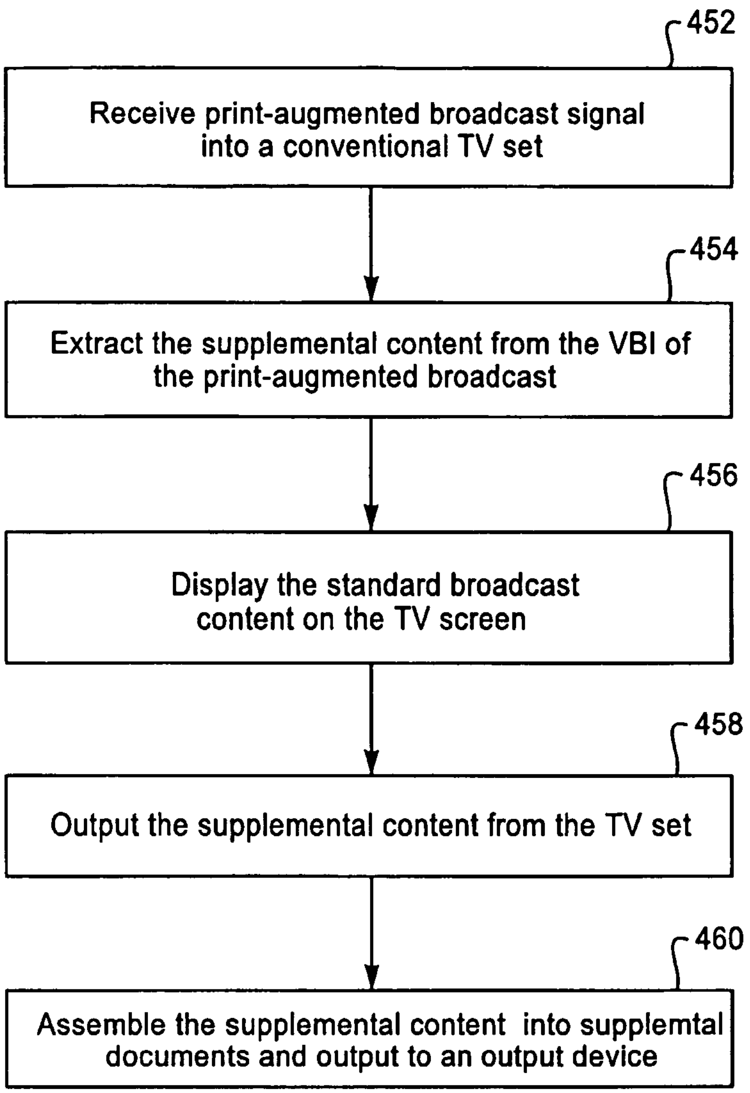
FIG. 4B illustrates a method for processing a received print-augmented broadcast signal in accordance with one embodiment of the present invention.

FIGS. 4A and 4B illustrate an embodiment of a system and corresponding method for processing a print-augmented broadcast signal. Referring first to the system 420 illustrated in FIG. 4A, the system includes a receiving means 421, a conventional television set 423, a content processor 425, content output means 427, and optionally a remote control unit 428. Exemplary receiving means include a satellite receiver 421*a*, a set top box 421*b*, or television aerials 421*c*, each of which is adapted to convert the received signal into a received version of the print-augmented broadcast signal 422 which can be processed by the convention television set 423.

FIG. 4B illustrates a method for processing a received print-augmented broadcast signal using the system of FIG. 4A. Initially at 452, the broadcast signal 422 is received (or recovered by the receiving means 421); the received signal 422 being in the format of a broadcast signal which can be processed by a conventional television set 423. The broadcast signal 422 carries received versions of the standard and the supplemental content, and conventional demodulation circuitry inside the television set 423 is used to extract the supplemental content from the broadcast signal 422 (process 454). The television set is operable to display the received version of the standard content on the television screen (process 456), and the extracted supplemental content 424 is output from the television set, via the Video Output port in one embodiment (process 458).

The supplemental content 424 is input to the content processor 425, which is operable to assemble the supplemental content into one or more printable supplement documents 426 (process 460), the details of which are further presented below. The supplemental documents 426 are output to output devices 427, which in two exemplary embodiments includes a printer 427*a* and a disk drive 427*b*, although other output devices may be used alternatively or in addition thereto. Connection between the content processor 425 and the output devices may be realized through various connection protocols, such as USB, IEE1394, SCSI, parallel connections and the like.

In a particular embodiment, the system 420 includes a remote control 428 (the functionality of which may be incorporated into a remote control of the conventional television set 422) operable to control the downloading processes of the content processor 425. In such an embodiment, the remote control 428 is operable to execute a download process in which supplemental content 424 corresponding to the currently viewed program portion is downloaded, assembled as a supplemental document and output to one or more of the output devices 427. In this manner, the viewer can download supplemental content concurrently with little or no disruption in their viewing experience.

Figure 5:
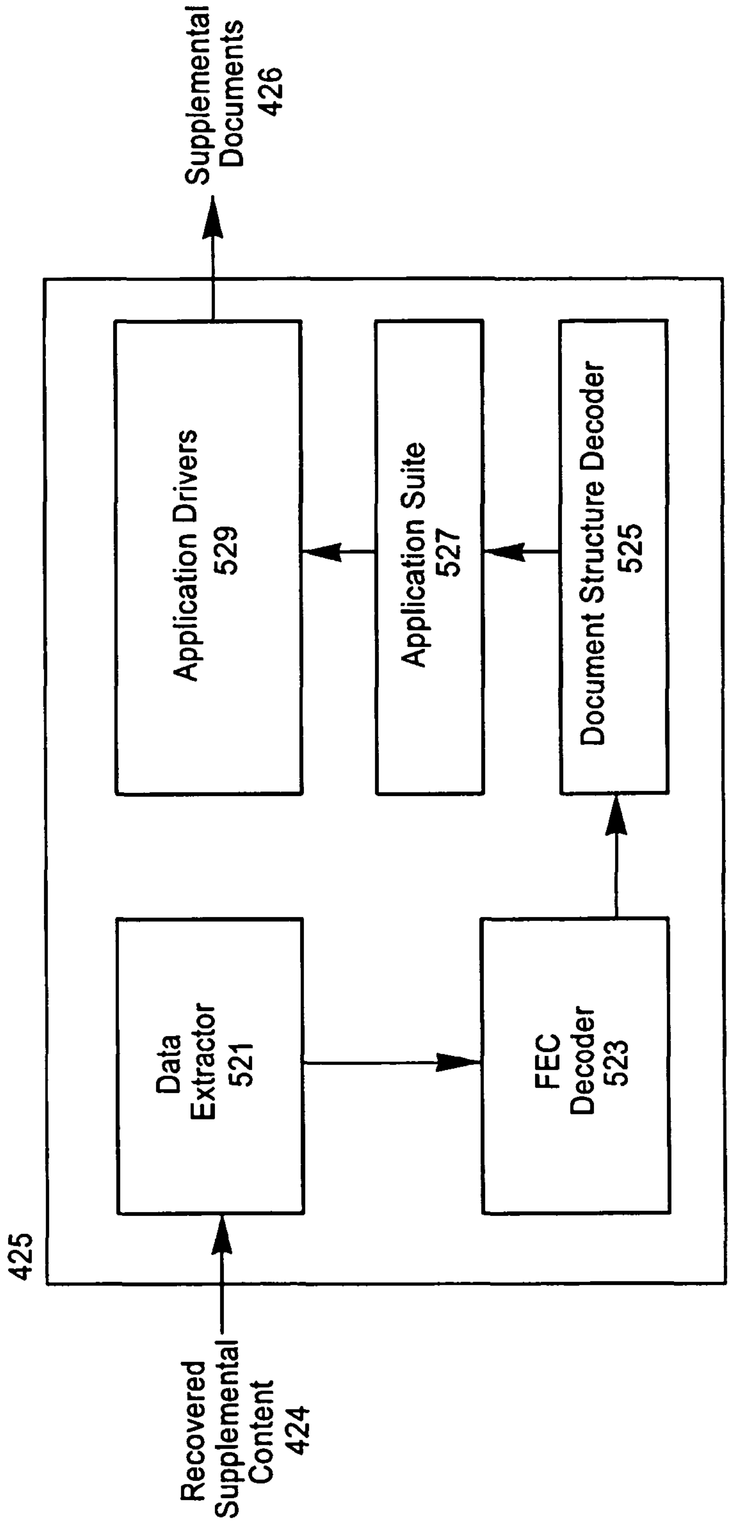
FIG. 5 illustrates a functional block diagram of the content processor shown in FIG. 4A.

FIG. 5 illustrates a functional block diagram of the content processor 425 that includes a data extractor 521, an FEC decoder 523, a document structure decoder 525, an application suite 527, and associated application drivers 529. During operation, recovered supplemental content 324 is supplied to the content processor 425 and data extracted therefrom. The data extractor 521 functions to decode further embedded supplemental content, for examples applets or programming, within the supplemental document. Additional operations within the data extractor 521 may include parsing the received supplemental content into segments, if this format is needed and the recovered supplemental content is not so arranged.

Once the supplemental content data is extracted, the supplemental content data is decoded using an FEC codec 523 and output to a document structure decoder 525. Of course, other data codecs (if any at all) may be used, with a specific condition being that the content modulator 324 and the content processor 425 implement complementary codecs.

In a particular embodiment, the supplemental content 424 (which may be many content segments, as described above) is recovered in the form of structured data, such as xml-formatted data. In such an embodiment, a document structure decoder 525 is employed to decode the meta-data, or some such similar content used in another structured document. The decoded data is supplied to an application suite 527 which further assembles the data into the requisite format needed for the particular application(s). Application drivers 529 are operable to interface with the particular output device 427, and may be incorporated within the application suite 527 in an alternative embodiment. The appropriately formatted data, referred to herein as a supplemental document 426, is subsequently provided to one or more of the output devices 427.

As described previously, the content processor 425 may further include a remote control unit 428, which, responsive to receiving a download command signal therefrom, performs one, some, or all of the aforementioned content processor functions. As an example, the content processor 425 continually processes a stream of content segments as described in relation to the content server 321 of FIG. 3A, each segment includes supplemental content corresponding to, and synchronized with, a segment of the standard program. When the viewer is presented with a topic about which they would like to acquire more information, the viewer activates the remote control unit 428, that signal, in turn, activating the application structure decoder 525, application suite 527 and application drivers 529 to generate the supplemental document(s) for output by one or more of the output devices 427. In this manner, the corresponding content segment can be downloaded (as a printed or stored electronic document, for instance) quite conveniently with little if any disturbance to the viewing experience.

Content-Augmented Radio Broadcasts

The systems and methods of FIGS. 3A and B above can also be used to compose, provide, and transmit print-augmented broadcasts for radio signals. As an example, a digital audio broadcasting system employs a non-content audio signal component known as a program associated data (PAD) channel, which can be used as the vehicle for transporting the supplemental content In such an embodiment, the system of 3A and corresponding method of FIG. 3B can be used in substantially the same manner as described previously, the aforementioned method operating to receive the DAB (or other standard radio broadcast signal analog or digital), and supplemental content corresponding to the specific DAB program, the supplemental content being provided by a content server 421 of specific DAB content. Next, a content modulator 324 designed for the processing for DAB signals is used to modulated the DAB supplemental content onto the PAD channel of the DAB signal, thereby forming a print-augmented DAB broadcast signal, the specifics of the modulation process being governed by the DAB broadcasting standards as known in the art. The print-augmented broadcast signal can then be transmitted via the appropriate means, exemplary embodiments which may include satellite, cable or tower transmitters.

Likewise, similar systems and methods to those of FIGS. 4A and B may be used for receiving and processing radio signals. In an exemplary embodiment for a radio signal of the aforementioned DAB standard, a receiving radio would include means, such as an antenna or modem, for receiving the radio broadcast signal. Additionally, the radio would include a demodulator or other such circuitry operable to extract the supplemental content from the PAD channel. The system would further include a content process 425 for assembling the supplemental content into one or more printable supplement documents, which, perhaps by remote control, could be printed or electronically stored via a printer 427*a* or disk drive 427*b*, respectively.

Systems and methods for providing supplemental program content in a manner which does not disturb the present viewing experience can be used in a host of different programs to improve the viewing or listening experience. Such exemplary programs include:

- Educational programs, such as informal documentaries, formal classroom sessions, etc., in which supplemental content in the form of additional facts, lecture notes, or examinations and the like are provided;
- Programs for disseminating public information, such a public health and safety or community cable programs in which the supplemental content is health and safety guidelines, benefit forms and/or procedures for obtaining them, and other community information;
- "Edutainment" programs, such as cooking or carpentry broadcasts which intend to both educate and entertain, wherein the supplemental content includes further information on specific products, or program details, such as a complete recipe or building plan, which are not easily conveyed during the program broadcast itself;
- Entertainment programs, such as cartoon shows, sports programs or serials in which the supplemental content provides additional information of a particular player or character, e.g., a detailed batting average of the currently viewed baseball player, additional script or information about characters in a cartoon or soap opera series;
- News programs in which supplemental content is used to provided unabridged news transcripts; and
- Any of the aforementioned programs in which the supplemental content includes program-specific advertising. Such advertising might include a listing of manufacturers whose products have been used or displayed on the program and/or advertisers/sponsors coupons.

The last exemplary application in which advertising is included within the supplement content provides the possibility of an advertiser-sponsored printing arrangement, in which the viewer's cost in printing the supplemental documents is subsidized by one of more of the program's advertisers. In a particular embodiment of this arrangement, the viewer initially prints a supplemental document which is advertised-sponsored. The printed supplemental document includes one or more unique sponsor identifiers (which could be formatted as xml meta-data) that identify a corresponding one or more advertisers. The one or more sponsor identifiers is subsequently forwarded to a redemption entity, which, upon verification, provides a credit to the viewer, the credit being applicable towards the purchase of additional printing supplies in one embodiment. This process is described in greater detail in the commonly assigned, concurrently filed patent application entitled: "Systems and Methods for Subsidizing the Printing Costs of Advertiser-Sponsored Documents" the contents of which are herein incorporated by reference.

Interactive program sessions represent another application for the present invention in which supplemental content may be advantageously used, in this case to improve a program's "stickiness" or viewer retention/loyalty. In a television broadcast embodiment of such a process, the afore-described supplemental content further includes (i) viewer queries regarding the content of the broadcast program, (ii) answers to the viewer queries, and (iii) additional, previously unrevealed program content.

The process involves querying the viewer (perhaps off-line of the broadcast program) one or more questions regarding the program's content, for example: "Captain Kirk's middle name was revealed during this episode. What is it?" The viewer is then presented with a choice of answers, one of which is correct, "Tibirius." (Capt. James Kirk® is a registered trademark of Paramount Pictures Corporation) Upon selection of this correct answer, the viewer is rewarded with the presentation of previously unrevealed program information. The previously unrevealed information may include additional little known facts or trivia about the program, hints as to upcoming program segments, or other information which would effectively engage the viewer. In this manner, the viewer is motivated to continue tuning into the program as the storyline develops.

The aforementioned processes may be carried out within the content processor 425, which operates (in this embodiment) in a bi-directional manner with the conventional television set 423 to display the aforementioned viewer queries, answers to the viewer queries, and previously unrevealed supplement content regarding the broadcast program. The session may be initiated and controlled using the remote control unit 428.

Alternatively, viewer answers may be provided using other communication modes, such as by telephone or Internet communication. Upon supplying the correct answers, the viewer would then be given a code with which (e.g. by keying the code into the remote control unit 428) to output the previously unrevealed information. The session can be performed offline of the broadcast program (e.g., afterwards or during commercial breaks), so as not to distract the viewer from the broadcast program.

As readily appreciated by those skilled in the art, the described processes may be implemented in hardware, software, firmware or a combination of these implementations as appropriate. For example, the processes of modulating and broadcasting signals may be carried out by hardware component modulators and transmitter systems operable to modulate and broadcast signals at the desired frequency and in the desired format. The described content processor may employ a combination of hardware front-end receiver components operable to additionally demodulate and/or condition the received supplemental content, and firmware/software operable to FEC decode the supplemental content and to store/process the resultant data as well as the output applications and device drivers. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for providing a print-augmented broadcast signal for transmission to one or more conventional broadcast receivers, the method comprising:

receiving a broadcast signal comprising (i) standard content for a particular broadcast program and (ii) a non-content portion;

receiving supplemental content which is associated with the standard content of the particular broadcast program, wherein the supplemental content comprises a plurality of segments, each of the supplemental content segments corresponding to a segment of standard content of the particular broadcast program; and combining the supplemental content onto the non-content portion of the broadcast signal to form a print-augmented broadcast signal, the print augmented broadcast signal comprising the standard content, which can be rendered on a conventional broadcast receiver, and the supplemental content, which is printable on-demand at a destination conventional broadcast receiver substantially concurrently with the rendering of the standard content.

2. The method of claim 1, wherein the broadcast signal comprises a television signal, wherein the non-content portion of the broadcast signal comprises the vertical blanking interval of the television signal, and wherein the conventional broadcast receiver comprises a conventional television set.

3. The method of claim 2, wherein the conventional television set comprises a television operable to process NTSC, PAL, SECAM or HDTV television broadcast signals.

4. The method of claim 1, wherein the broadcast signal comprises a digital audio broadcasting signal, wherein the non-content portion of the broadcast signal comprises a program associated data channel, and wherein the conventional broadcast receiver comprises a digital audio radio receiver.

5. The method of claim 1, wherein the supplemental content comprises a sponsor ID which identifies an advertising sponsor of the particular broadcast program.

6. The method of claim 5, wherein the supplemental content further comprises:

one or more viewer queries regarding the content of the particular broadcast program; and corresponding answers to the viewer queries.

7. A system operable to provide a print augmented broadcast signal for transmission to one or more conventional broadcast receivers, the system comprising:

means for receiving a broadcast signal, the broadcast signal comprising: (i) standard content for a particular broadcast program, and (ii) a non-content portion;

a content server configured to provide supplemental content, the supplemental content being associated with the standard content of the particular broadcast program, wherein the supplemental content comprises a plurality of segments, each of the segments corresponding to a segment of standard content of the particular broadcast program; and a content modulator configured to combine the supplemental content onto the non-content portion of the broadcast signal, thereby forming a print augmented broadcast signal, wherein the print-augmented broadcast signal comprises the standard content, which can be rendered on a conventional broadcast receiver, and the supplemental content, which is printable on demand at a destination conventional broadcast receiver substantially concurrently with the rendering of the standard content.

8. The system of claim 7, wherein the supplemental content comprises a sponsor ID which identifies an advertising sponsor of the particular broadcast program.

9. The system of claim 7, wherein the supplemental content further comprises:

one or more viewer queries regarding the content of the particular broadcast program;

corresponding answers to the viewer queries.

10. The system of claim 7, wherein the broadcast signal comprises a televisions signal, wherein the non-content portion of the broadcast signal comprises the vertical blanking interval of the television signal, and wherein the receiver comprises a conventional television set.

11. The system of claim 7, wherein the broadcast signal comprises a digital audio broadcasting signal, wherein the non-content portion of the broadcast signal comprises program associated data, wherein the conventional broadcast receiver comprises a digital audio radio receiver.

12. A method for processing a print-augmented broadcast signal, the method comprising:

receiving a print-augmented broadcast signal within a conventional broadcast receiver, the print-augmented broadcast signal comprising (i) standard content for a particular broadcast program, and (ii) supplemental content which is associated with the standard content of the particular broadcast program, wherein the supplemental content comprises a plurality of segments, each of the segments corresponding to a segment of standard content of the particular broadcast program and wherein the supplemental content is combined onto a non-content portion of the print-augmented broadcast signal;

extracting, within the conventional broadcast receiver, the supplemental content from the non-content portion of the print-augmented broadcast signal, rendering the standard content on the conventional broadcast receiver; and outputting the supplemental content from the conventional broadcast receiver, wherein the supplemental content is printable on-demand substantially concurrently with the standard content's rendering.

13. The method of claim 12, wherein the print-augmented broadcast signal comprises a television signal comprising a vertical blanking interval onto which supplemental content is combined, wherein extracting comprises extracting the supplemental content from the vertical blanking interface of the television signal, and wherein rendering the standard content comprises displaying the standard content carried by the television signal on a television screen.

14. The method of claim 12, wherein the print-augmented broadcast signal comprises a digital audio broadcast signal comprising a program associated data channel onto which supplemental content is modulated; wherein extracting comprises extracting the supplemental content from the program associated data channel, and wherein rendering the standard content comprises playing the audio program carried by the digital audio signal.

15. The method of claim 12, further comprising assembling one or more segments into a respective one or more supplemental documents.

16. The method of claim 15, further comprising printing one or more of the assembled supplemental documents.

17. The method of claim 12, further comprising:

presenting queries to the viewer;

receiving responses corresponding to presented queries; and providing answers to the viewer queries presented.

18. The method of claim 17, further comprising presenting previously unrevealed supplemental content when a predetermined number of received responses are deemed correct.

19. A receiving system for processing a print-augmented broadcast signal, the print-augmented broadcast signal including standard content for a particular broadcast program and supplemental content which is combined onto a non-content portion of the print-augmented broadcast signal, the supplemental content associated with the particular broadcast program, the receiving system comprising:

a conventional broadcast receiver configured to receive the print augmented broadcast signal, the conventional broadcast receiver operable to render the standard content, and to extract from the non-content broadcast signal portion and output the supplemental content wherein the supplemental content comprises a plurality of segments, each of the segments corresponding to a segment of standard content of the particular broadcast program; and a content processor having an input coupled to receive the extracted supplemental content, and an output, the content processor operable to assemble, using the supplemental content, a supplemental document which is printable on-demand substantially concurrently with the broadcast program's rendering.

20. The system of claim 19, wherein the print-augmented broadcast signal comprises a television signal comprising a vertical blanking interval onto which supplemental content is combined, wherein the conventional broadcast receiver comprises a conventional television set operable to extract the supplemental content from the vertical blanking interface of the television signal, and to render the standard content by displaying the standard content carried by the television signal on the screen of the conventional television set.

21. The system of claim 20, wherein the print-augmented broadcast signal comprises a digital audio broadcast signal comprising a program associated data channel onto which the supplemental content is combined; wherein the broadcast receiver comprises a digital audio radio receiver operable to extract the supplemental content from the program associated data channel, and wherein the standard content is rendered by playing the audio program carried by the digital audio signal.

22. The receiving system of claim 19, further comprising a content processor configured to receive and assemble one or more segments into a respective one or more supplemental documents.

23. The receiving system of claim 22, further comprising a printing device configured to receive and print one or more assembled supplemental documents.

24. A computer program product, resident of a non-transitory computer-readable medium, which is operable to execute instruction code for controlling a system to provide a print-augmented broadcast signal for transmission to one or more conventional broadcast receivers, the computer program product comprising:

instruction code to receive a broadcast signal comprising (i) standard content for a particular broadcast program and (ii) a non-content portion;

instruction code to receive supplemental content which is associated with the standard content of the particular broadcast program, wherein the supplemental content comprises a plurality of segments, each of the segments corresponding to a segment of standard content of the particular broadcast program; and instruction code to combine the supplemental content onto the non-content portion of the broadcast signal to form a print-augmented broadcast signal, the print-augmented broadcast signal comprising the standard content, which can be rendered on a conventional broadcast receiver, and the supplemental content, which is printable on-demand at a destination conventional broadcast receiver substantially concurrently with the rendering of the standard content.

25. A computer program product, resident of a non-transitory computer-readable medium, which is operable to execute instruction code for controlling a system to process a received print-augmented broadcast signal, the computer program product comprising:

instruction code to receive a print-augmented broadcast signal within a conventional broadcast receiver, the print-augmented broadcast signal comprising (i) standard content for a particular broadcast program, and (ii) supplemental content which is associated with the standard content of the particular broadcast program, wherein the supplemental content comprises a plurality of segments, each of the segments corresponding to a segment of standard content of the particular broadcast program, and wherein the supplemental content is combined onto a non-content portion of the print-augmented broadcast signal;

instruction code to extract, within the conventional broadcast receiver, the supplemental content from the non-content portion of the print-augmented broadcast signal, instruction code to render the standard content on the conventional broadcast receiver;

and instruction code to output the supplemental content from the conventional broadcast receiver, wherein the supplemental content is printable on-demand substantially concurrently with the standard content's rendering.

26. The computer program product of claim 25, wherein the broadcast signal comprises a television signal, wherein the non-content portion of the broadcast signal comprises the vertical blanking interval of the television signal, and wherein the conventional broadcast receiver comprises a conventional television set.

27. The computer program product of claim 25, wherein the broadcast signal comprises a digital audio broadcasting signal, wherein the non-content portion of the broadcast signal comprises a program associated data channel, and wherein the conventional broadcast receiver comprises a digital audio radio receiver.

* * * * *